United States Patent [19]

Volk, Jr.

[11] Patent Number: 4,671,757
[45] Date of Patent: Jun. 9, 1987

[54] MICROWAVE HEATING IN A PELLET MILL

[75] Inventor: Joseph A. Volk, Jr., Florissant, Mo.

[73] Assignee: Beta Raven, Inc., Hazelwood, Mo.

[21] Appl. No.: 741,855

[22] Filed: Jun. 6, 1985

[51] Int. Cl.⁴ .............................................. B29B 7/82
[52] U.S. Cl. .......................... 425/144; 219/10.55 A;
219/10.55 B; 366/145; 366/146; 425/174.4;
425/DIG. 230
[58] Field of Search ..................... 425/143, 144, 174.4,
425/DIG. 230; 366/144, 146, 148, 23, 24, 145;
219/10.55 R, 10.55 A, 10.55 B

[56] References Cited

U.S. PATENT DOCUMENTS

| | | | |
|---|---|---|---|
| 2,353,362 | 7/1944 | Rudd | 219/10.55 A |
| 3,555,693 | 1/1971 | Futer | 219/10.55 A |
| 3,573,924 | 4/1971 | Zarow | 426/630 |
| 3,867,607 | 2/1975 | Ohtani | 219/10.55 R |
| 3,932,736 | 1/1976 | Zarow et al. | 425/DIG. 230 |
| 3,963,892 | 6/1976 | Camph et al. | 219/10.55 A |
| 4,003,554 | 1/1977 | Chauffoureaux | 366/146 |
| 4,183,675 | 1/1980 | Zarow | 366/144 |
| 4,284,869 | 8/1981 | Pinkstaff | 219/10.55 A |
| 4,330,946 | 5/1982 | Courneya | 219/10.55 R |
| 4,340,937 | 7/1982 | Volk, Jr. | 364/468 |
| 4,358,652 | 11/1982 | Kaarup | 219/10.55 R |
| 4,398,076 | 8/1983 | Hanson | 219/10.55 A |
| 4,406,937 | 9/1983 | Soulier | 219/10.55 A |
| 4,463,430 | 7/1984 | Volk, Jr. et al. | 364/173 |
| 4,533,810 | 8/1985 | Harmon et al. | 219/10.55 B |

FOREIGN PATENT DOCUMENTS 2124860  2/1984  United Kingdom ......... 219/10.55 R

*Primary Examiner*—Jay H. Woo
*Assistant Examiner*—James C. Housel
*Attorney, Agent, or Firm*—Rogers, Howell, Moore & Haferkamp

[57] ABSTRACT

A system for adding heat to dry material as it is conditioned in preparation for pelleting in a pellet mill includes a plurality of groups of microwave magnetrons and a control system to control the energization of those magnetrons in response to the throughput of the dry material and the temperature or temperature change of the material.

8 Claims, 1 Drawing Figure

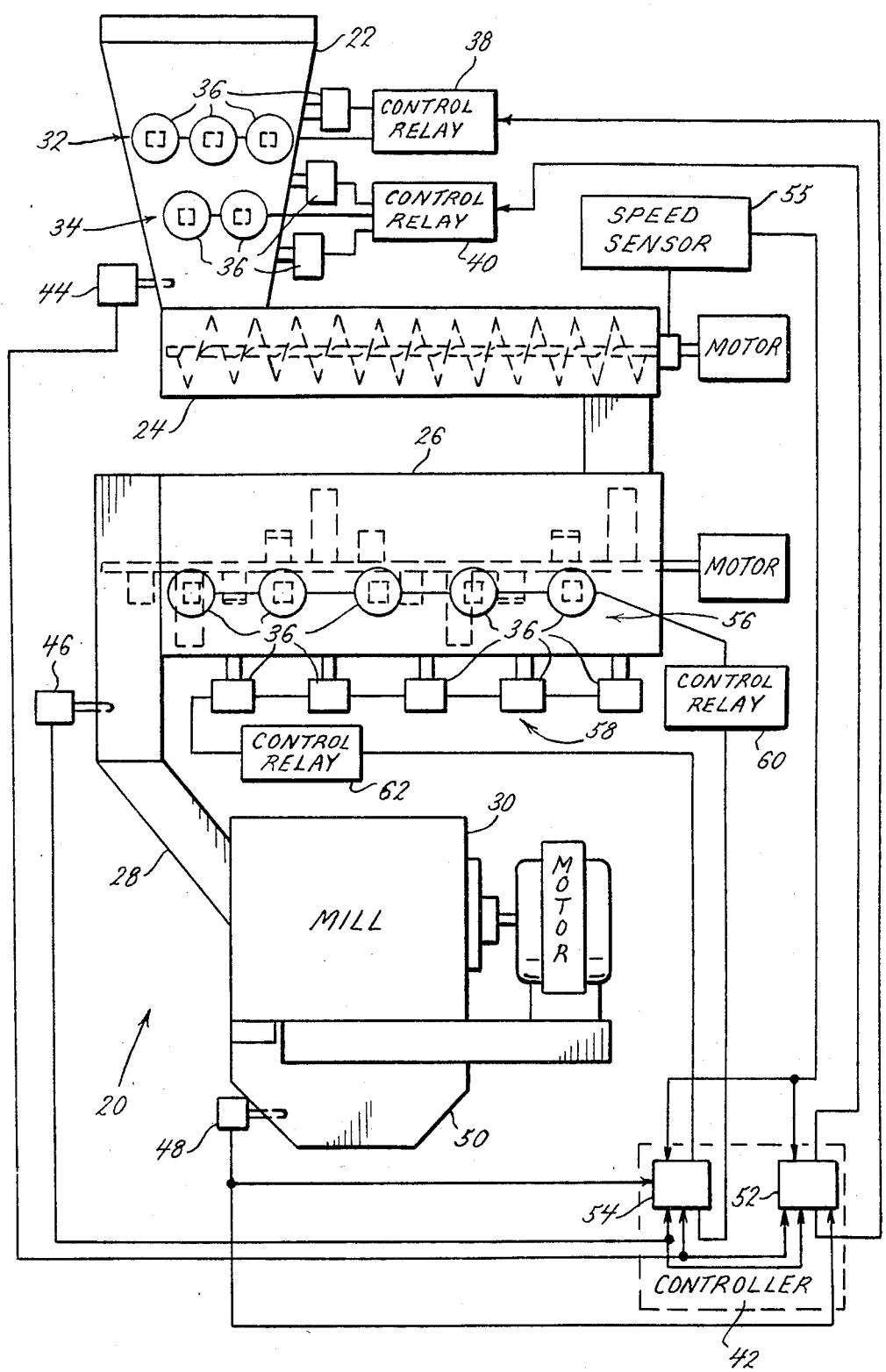

MICROWAVE HEATING IN A PELLET MILL

BACKGROUND AND SUMMARY

Automation of the pelleting process wherein dry feed material is mixed with moisture and heated before entering the pellet mill and being pelleted has been substantially advanced through the efforts of the inventor herein who is also an inventor of prior U.S. Pat. Nos. 3,932,736; 4,340,937; and 4,463,430. These prior patents disclose and claim controls which automate the pelleting process by controlling the flow rate of the dry material, the amount of moisture added, and the amount of heat added to the material before it enters the pellet mill. As is described more completely in these prior patents, it is very important that the moisture content and temperature of the material, and the difference in temperature taken at various points in the pellet mill be controlled to assure optimum pelleting for different kinds of materials. Still another prior art patent which addresses this problem is U.S. Pat. No. 3,573,924.

In the prior art, and as disclosed in these prior patents, the material is loaded into a surge hopper, and then fed at a controlled rate through a mixer/conditioner in which the moisture and heat are added to the dry material. The output of the mixer/conditioner is then input to the pellet mill itself where it is squeezed through a die by a roller, and a plurality of knives cut the pellets to size. Typically, heat can be added to the dry material in a number of ways. Chief among these is by the direct addition of steam to the dry material in the mixer/conditioner. The addition of steam is effective in raising the temperature of the dry material, but it also adds moisture. For some dry materials this direct addition of steam is very effective. However, for some dry materials it is desired to only add heat as the moisture content of the material may be already great enough to satisfy the pelleting requirement. For these applications, dry heat is typically added by providing a steam jacket which surrounds the mixer/conditioner and through which steam is circulated. Heat is thus added by radiation and direct contact with the walls of the mixer/conditioner.

However, the steam jacketed mixer/conditioner of the prior art does have several drawbacks. First of all, it is quite expensive as it must be sealed and requires a boiler certification. By its very nature, it is also maintenance intensive. From an operational consideration, the surface area which can be utilized to exchange the heat from the steam to the dry material is fixed, and also the temperature of the steam is fixed so that the capacity to deliver heat to the dry material is fixed, and remains constant irrespective of the flow rate of the material through the mixer/conditioner. Thus, as the flow rate of the material varies, so does the amount of heat added by the steam jacket. This results in an indeterminate amount of heat being added to the dry material thereby rendering the control of the addition of dry heat very difficult. Also, the limited throughput of the steam jacket makes it marginally effective at high flow rates of dry material.

To solve these and other problems, the inventor herein has succeeded in developing a way of adding dry heat to the material with microwave energy as it flows through the mixer/conditioner. This can be achieved by utilizing a plurality of magnetrons and placing them at any point in the process upstream of the pellet mill. This can be either in the mixer/conditioner or in the surge hopper which stores the dry material prior to its entering the mixer/conditioner. To accommodate varying flow rates, groups of magnetrons may be provided, and these groups may be separately enabled as the flow rate of dry material through the pellet mill increases. For example, twenty magnetrons may be installed, and these may be grouped in four groups of five each. Thus, at a low speed, only a single group may be made available for energization and of the five in that single group, anywhere from one to five of these magnetrons may be energized to provide further fine tuning of the heat applied to the dry material. Above a threshold, another group of magnetrons may be enabled for control, and the process extended as the throughput of the mixer/conditioner increases until all four groups of magnetrons are enabled and available for energization. A temperature probe installed directly downstream of the point where the energy is added to the dry feed senses the temperature of the dry feed and is used by the control, in addition to the feeder speed, to determine the number of magnetrons and groups of magnetrons to be energized. A temperature probe immediately above the pellet mill itself may be used to sense the temperature of the material immediately before it enters the mill for pelleting.

Because of the nature of microwave energy, several modifications must be made to accommodate its use in the pellet mill system. To eliminate arcing, the picks in the mixer/conditioner used to move the dry material therethrough must be made of a ceramic substance or a suitable substitute that is non-conductive. Alternately, some other modification must be made to eliminate the problem of arcing in the mixer/conditioner. To satisfy the relevant safety requirements for use of microwave devices, door interlock switches, metal gaskets, and microwave warning devices may also have to be added to the surge hopper or mixer/conditioner.

While the foregoing provides a brief synopsis of the major advantages and features of the present invention, a more complete understanding may be gained by referring to the drawing and description of the preferred embodiment which follows.

BRIEF DESCRIPTION OF THE DRAWING

The drawing is a schematic representation of a pellet mill having a plurality of magnetrons mounted to the surge hopper and to the mixer/conditioner.

DETAILED DESCRIPTION OF THE PREFERRED EMBODIMENT

As shown in the drawing, a pellet mill 20 includes a surge hopper 22 which provides a storage place for dry material, a screw feeder 24 which moves the dry material from the surge hopper 22 at a controlled rate into the mixer/conditioner 26 where moisture and heat is added to the dry material, into a downspout 28, and thence into the pellet mill 30 where the pellets are formed. In accordance with the teaching of the present invention, two groups 32, 34 of magnetrons 36 are individually controlled by an associated control relay 38, 40 such that one or more of the magnetrons 36 in either group 32, 34 may be turned on by control relay 38, 40, as desired, by main controller 42. A temperature sensor 44 senses the temperature of the dry material as it exits the surge hopper 22, a second temperature sensor 46 is mounted to spout 28, and a third temperature sensor 48 is mounted to cooler 50. Each of these temperature sensors 44, 46, 48 produces a control signal which is input to the surge hopper microwave control 52, and to the mixer/conditioner microwave controller 54. Additionally, a speed sensor 55 senses the speed of the screw feeder 24 and produces a control signal which is input to both microwave controllers 52, 54.

Similarly, two groups 56, 58 of magnetrons 36 are each individually controlled by associated control relays 60, 62, with control relays 60, 62 being controlled by the mixer/conditioner microwave controller 54 of main control 42. Each microwave controller 52, 54 thus receives temperature inputs from the three temperature sensors 44, 46, 48 and can be programmed to control the temperature of the dry material in response to any single temperature, or any temperature difference ($\Delta T$) as might be sensed by taking the difference between the temperatures sensed by any two of the temperature sensors 44, 46, 48. Control through these temperature differences or $\Delta T$'s is more fully and completely disclosed in the inventor's prior patents listed above, the disclosures of which are incorporated herein by reference. Additionally, as shown in these prior patents, a pre-selected temperature or temperature differential ($\Delta T$) may be input by an operator and used by the main controller 42 to control the addition of heat. Although not shown in this drawing, it is clearly shown in these prior patents that the direct addition of steam and other liquids may be also used to control the temperature of the dry material as it flows through the mixer/conditioner 26, and these may be controlled in tandem with the dry heat being added by the system of the present invention.

In operation, a plurality of groups of magnetrons may be installed on either the surge hopper, the mixer/conditioner, or both as needed to handle the capacity of the pellet mill. Each group of magnetrons has a control relay means with one or more control relays as shown diagramatically in the drawing. Each of these control relay means has sufficient control relays to individually actuate each magnetron of a group in response to an associated main controller. The main controller is responsive to the temperature and speed inputs associated with that location. Furthermore, these main controllers may have means for an operator to pre-select a desired temperature, as is known in the art, or a desired temperature differential as is disclosed in the inventor's prior patents listed above. Thus, for faster throughputs, more than one group of magnetrons may be enabled such that the controller can actuate any combination of magnetrons, as desired or required.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. In a pellet mill for processing material into pellets, said pellet mill having an input section and a pellet producing section, means to add moisture and means to add heat to the material as the material flows through the input section, and a control for said pellet mill, said control having means to monitor one or more operating parameters of the mill and adjust the amount of moisture and heat added to said material, the improvement comprising a plurality of sources of microwave energy positioned along the input section, said sources being the means to add heat to the material as it flows through the input section, said sources being divided into more than one group, means to sense the temperature of the material, means to sense the flow rate of the material through the input section, and means to control said sources in response to the temperature sensing means, said source control means further comprising means to separately operate said groups of sources in response to the flow rate sensing means, said source control means thereby controlling the input of heat to the material.

2. In a pellet mill for processing material into pellets, said pellet mill having an input section and a pellet producing section, means to add moisture and means to apply heat to the material as the material flows through the input section, said heat applying means comprising a plurality of microwave energy producing magnetrons, said plurality of magnetrons being divided into more than one group, each of said groups comprising at least one magnetron, means to sense the temperature of the material, means to sense the flow rate of material through the input section, and a control for said pellet mill, the control having means to control said sources in response to the temperature sensing means and means to separately operate said groups of magnetrons in response to the flow rate sensing means, said source control means thereby controlling the input of heat to the material.

3. The device of claim 2 wherein said temperature sensing means comprises means to sense the temperature at two different locations in the pellet mill, means to compare said temperatures, and wherein said control means has means to operate said groups of magnetrons in response to said temperature comparison means.

4. The device of claim 2 wherein the input section comprises a surge bin, and at least one feeder means, said feeder means having means to controllably feed material from the surge bin to the pellet producing section, and wherein the heat applying means has means to apply heat to the material in the surge bin.

5. The device of claim 4 wherein the temperature sensing means is positioned at the output of the feeder means to sense the temperature of the material as it flows into the pellet producing section.

6. The device of claim 5 wherein said magnetrons are offset mounted to the surge bin so that each of said magnetrons do not radiate energy directly into another of said magnetrons.

7. The device of claim 6 wherein said group operating means comprises a control relay means.

8. In a pellet mill for processing material into pellets, said pellet mill having an input section and a pellet producing section, means to add moisture and means to add heat to the material as the material flows through the input section, and a control for said pellet mill, said control having means to monitor one or more operating parameters of the mill and adjust the amount of moisture and heat added to said material, the improvement comprising a plurality of sources of microwave energy positioned along the input section, said sources being the means to add heat to the material flowing through the input section, said sources being divided into more than one group, means to sense the temperature of the material, means to sense the flow rate of the material through the input section, said control having means to control said sources in response to said temperature sensing means, and means to separately control said groups in response to the flow rate sensing means, said source control means thereby controlling the input of heat to the material.

* * * * *